United States Patent
Jiang

(10) Patent No.: US 6,952,356 B2
(45) Date of Patent: Oct. 4, 2005

(54) ADAPTIVE OVER-CURRENT DETECTION

(75) Inventor: Jiandong Jiang, The Colony, TX (US)

(73) Assignee: Texas Instruments Incorporated, Dallas, TX (US)

( * ) Notice: Subject to any disclaimer, the term of this patent is extended or adjusted under 35 U.S.C. 154(b) by 80 days.

(21) Appl. No.: 10/649,018

(22) Filed: Aug. 27, 2003

(65) Prior Publication Data

US 2005/0047178 A1 Mar. 3, 2005

(51) Int. Cl.$^7$ .............................................. H02H 7/10
(52) U.S. Cl. ............................ 363/50; 361/18; 361/87; 361/93.2; 361/94
(58) Field of Search ........................... 363/41, 56.03, 363/50; 361/18, 87, 93.1, 93.2, 94

(56) References Cited

U.S. PATENT DOCUMENTS

| | | | |
|---|---|---|---|
| 3,906,258 A | * | 9/1975 | Moe ............................. 327/36 |
| 4,330,816 A | * | 5/1982 | Imazeki et al. ........... 363/21.05 |
| 4,839,770 A | * | 6/1989 | Ruta ............................. 361/94 |
| 6,418,002 B1 | * | 7/2002 | Yang et al. .................... 361/90 |

* cited by examiner

*Primary Examiner*—Gary L Laxton
(74) *Attorney, Agent, or Firm*—W. Daniel Swayze, Jr.; W. James Brady; Frederick J. Telecky, Jr.

(57) ABSTRACT

Disclosed are methods and apparatus for over-current detection in PWM power stages. Disclosed methods and apparatus provide over-current detection with adaptive filtering according to the pulse width of the PWM input signal. Methods and apparatus for their implementation are described for detecting the pulse width of a PWM signal in the PWM circuit. According to the detected pulse width, a digital delay less than the pulse width of the PWM signal is selected from among a plurality of available digital delays. Further, an over-current condition in the PWM power stage is detected. The detected over-current signal is filtered by means of the selected digital delay and an over-current detection result is output.

13 Claims, 6 Drawing Sheets

ADAPTIVE OVER-CURRENT DETECTION

TECHNICAL FIELD

The invention relates to over-current detection in electronic circuits. More particularly, the invention relates to methods and circuits for over-current detection in pulse width modulation (PWM) power stage integrated circuits (ICs) and gate drive ICs. PWM power stage ICs and gate drive ICs are used in switching power supply applications, DVD players, A/V receivers, home theater, and other audio applications.

BACKGROUND OF THE INVENTION

Protecting electronic circuits from malfunctioning or becoming damaged by exposure to excessive current has long been a critical requirement. In practice, the reliable detection of the presence of over-current (OC) upon which circuit protection relies can be difficult due to some limitations. In power output stage circuitry, and gate drive circuitry in particular, the detection of over-current is complicated by the presence of noise, mainly due to ground bouncing and reverse recovery of power devices (either BJT or MOSFET). It is known in the arts to use various arrangements of analog circuit components to filter out the noise from an OC detection signal. Analog filtering solutions are beset with many problems, however, including variability due to power supply and process variations and imperfectly matched over-current detection circuit components. Usually, there is a wide distribution of OC limits if using analog filtering. As a result of these shortcomings, the over-current detection circuits known in the arts are subject to a tendency to erroneously report the existence of an over-current condition when such a condition does not in fact exist, causing unwanted interruptions and delays. Failure to detect over-current conditions as they occur, however, may permit excessive current to damage the device.

Due to these and other problems with over-current detection, there is a need in the art for over-current protection that is more accurate and less susceptible to noise.

SUMMARY OF THE INVENTION

In carrying out the principles of the present invention, in accordance with preferred embodiments thereof, methods and circuits are provided in which digital processing techniques and components are used to implement over-current detection. The methods and circuits of the invention provide advantages over the prior art.

According to preferred embodiments of the invention, methods for over-current detection in a PWM circuit include detecting the pulse width of the PWM signal. Steps are taken to detect an over-current condition. Further steps adaptively filter out the false detection of an over-current according to the PWM signal pulse width.

According to one aspect of the invention, a method for over-current detection in a PWM circuit employs steps for detecting the pulse width of the PWM signal in the PWM circuit and selecting a digital delay less than the pulse width of the PWM signal. In a further step, an over-current condition in the PWM power stage circuit is detected and an over-current detection signal is provided. The noise in the over-current detection signal is filtered out by means of logically AND'ing with the delayed OC detection signal, and the output of the AND gate is the final over-current detection signal.

According to an aspect of the preferred embodiments of the invention, a plurality of selectable digital delays are made available for selection in accordance with the detected PWM pulse width.

According to another aspect of the invention at least one selectable digital delay has a duration less than one half of a pre-selected minimum pulse width expected for the PWM circuit.

According to yet another aspect of the invention, a method includes a step of outputting an over-current detection result for an over-current detection signal having a duration greater than the selected digital delay.

According to a further aspect of the invention, a preferred embodiment is disclosed in which an over-current detection circuit for use in a PWM system is described. The over-current detection circuit has a plurality of selectable digital delay paths. A pulse width detection circuit is included for detecting the pulse width of the PWM signal. For detecting the presence of an over-current in the PWM system, an over-current detector is provided. A filter is used for outputting an over-current detection result.

According to a preferred embodiment of a circuit according to the invention, digital logic means is employed for indicating the detection of an over-current detection signal having the duration equal to or greater than the PWM pulse width.

The invention provides technical advantages including but not limited to improved over-current detection accuracy, low susceptibility to noise, a decrease in chip area, and reduced cost. These and other features, advantages, and benefits of the present invention can be understood upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to the references in the figures unless otherwise noted. Descriptive and directional terms used in the written description such as first, second, left, right, etc., refer to the drawings themselves as laid out on the paper and not to physical limitations of the invention unless specifically noted. The drawings are not to scale, and some features of embodiments shown and discussed are simplified or amplified for illustrating the principles, features, and advantages of the invention.

DETAILED DESCRIPTION OF PREFERRED EMBODIMENTS

Figure 1:
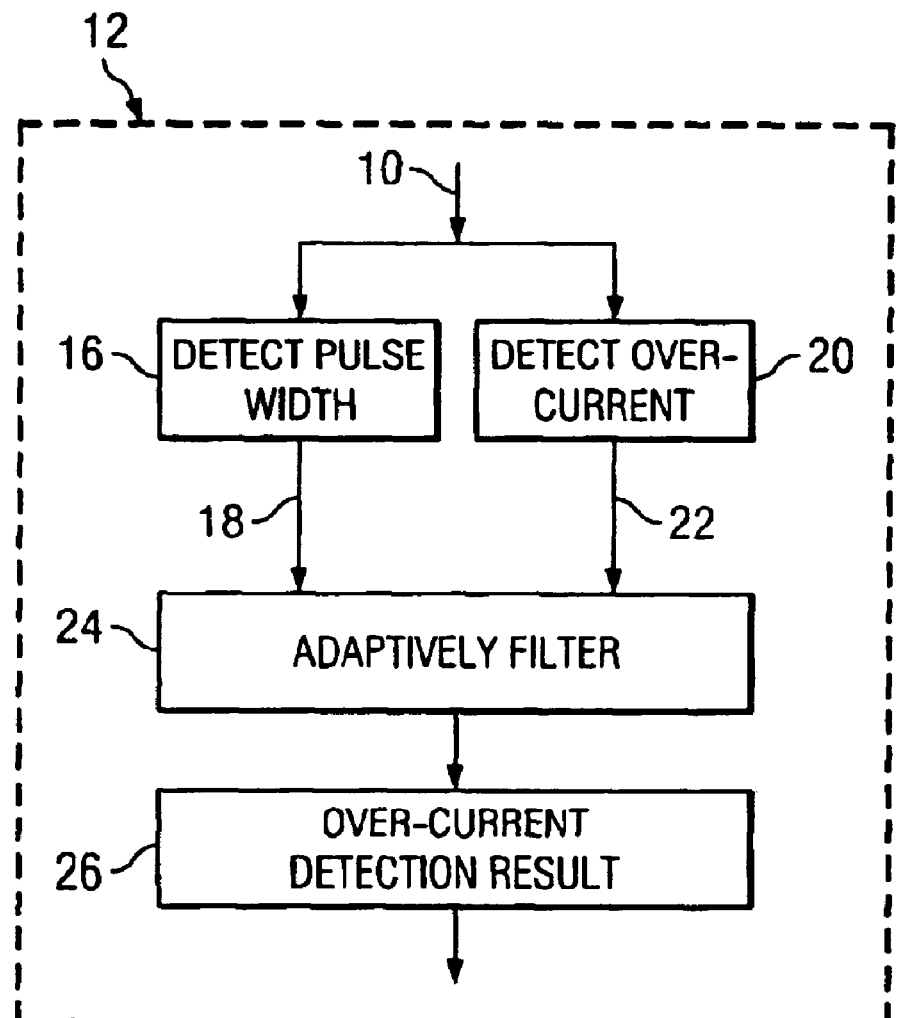
FIG. 1 is a process flow diagram illustrating an example of an over-current detection method according to the invention.

In general, the preferred embodiments of the invention provide over-current protection solutions particularly useful for PWM power stages. Referring first primarily to the process flow diagram of FIG. 1, a PWM signal 10 in a PWM switching circuitry 12 is monitored. The pulse width of the PWM signal 10 is detected, as shown at step 16. As indicated by arrow path 18, the pulse width is subsequently used to adaptively filter 24 out the noises in any detected over-current condition. Over-current conditions are detected as shown at step 20. An indication of a detected over-current condition, shown by arrow path 22, is provided. At step 24, the over-current indication 22 is adaptively filtered. It should be noted that the adaptive filtering is performed in step 24 by eliminating false over-current indications in 22. This is preferably accomplished by means of eliminating over-current indications 22 for events shorter than a propagation delay selected based upon the determination of the pulse width in step 18. An over-current detection result is generated as shown at step 26. Typically, the over-current detection result 26 will be used as known in the arts to initiate appropriate protective action(s) in the PWM power stage 12.

Figure 2A:
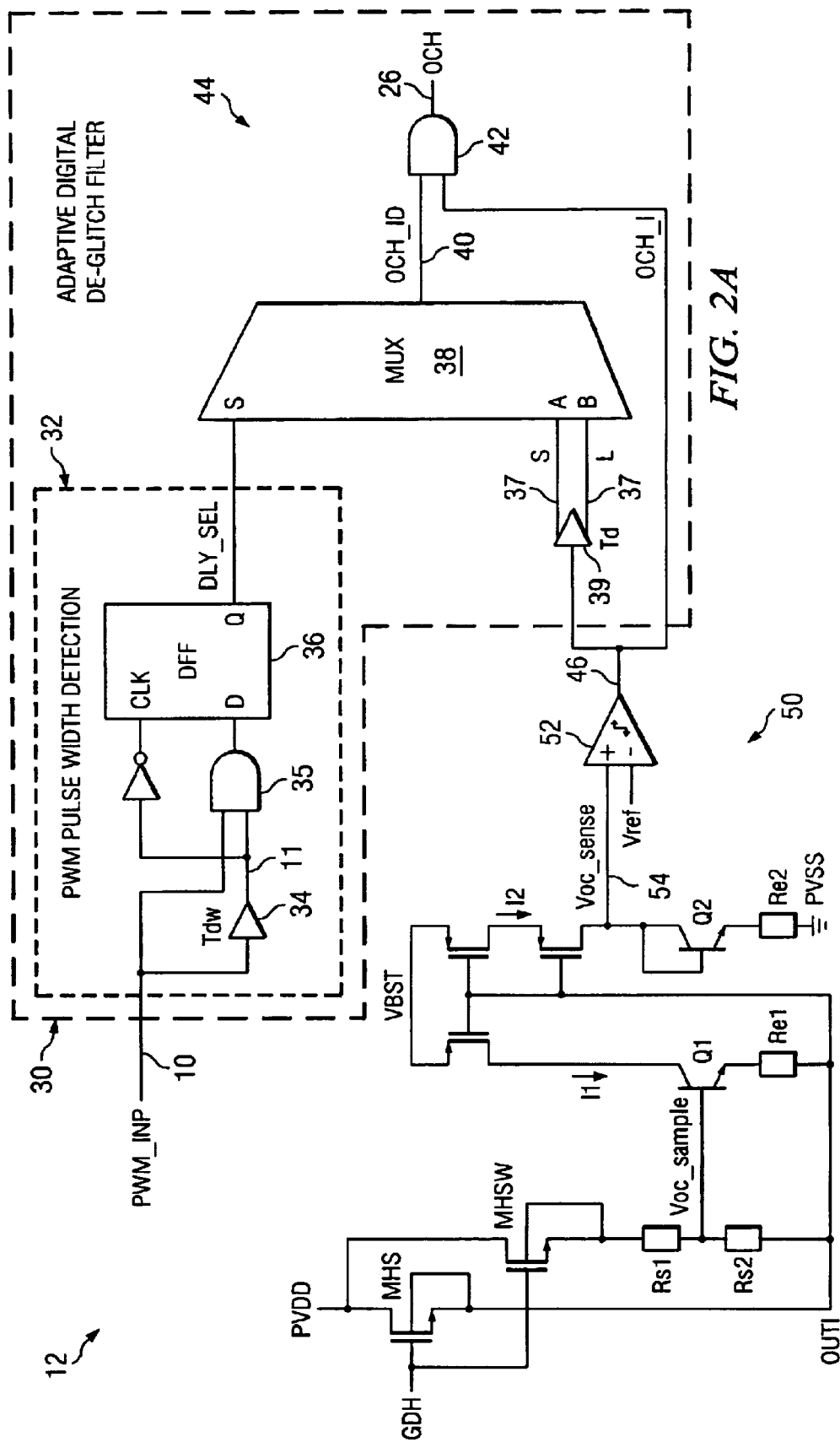
FIG. 2A is a schematic block diagram illustrating an example of an over-current detection circuit for high side power MOSFET according to the invention.
Figure 2B:
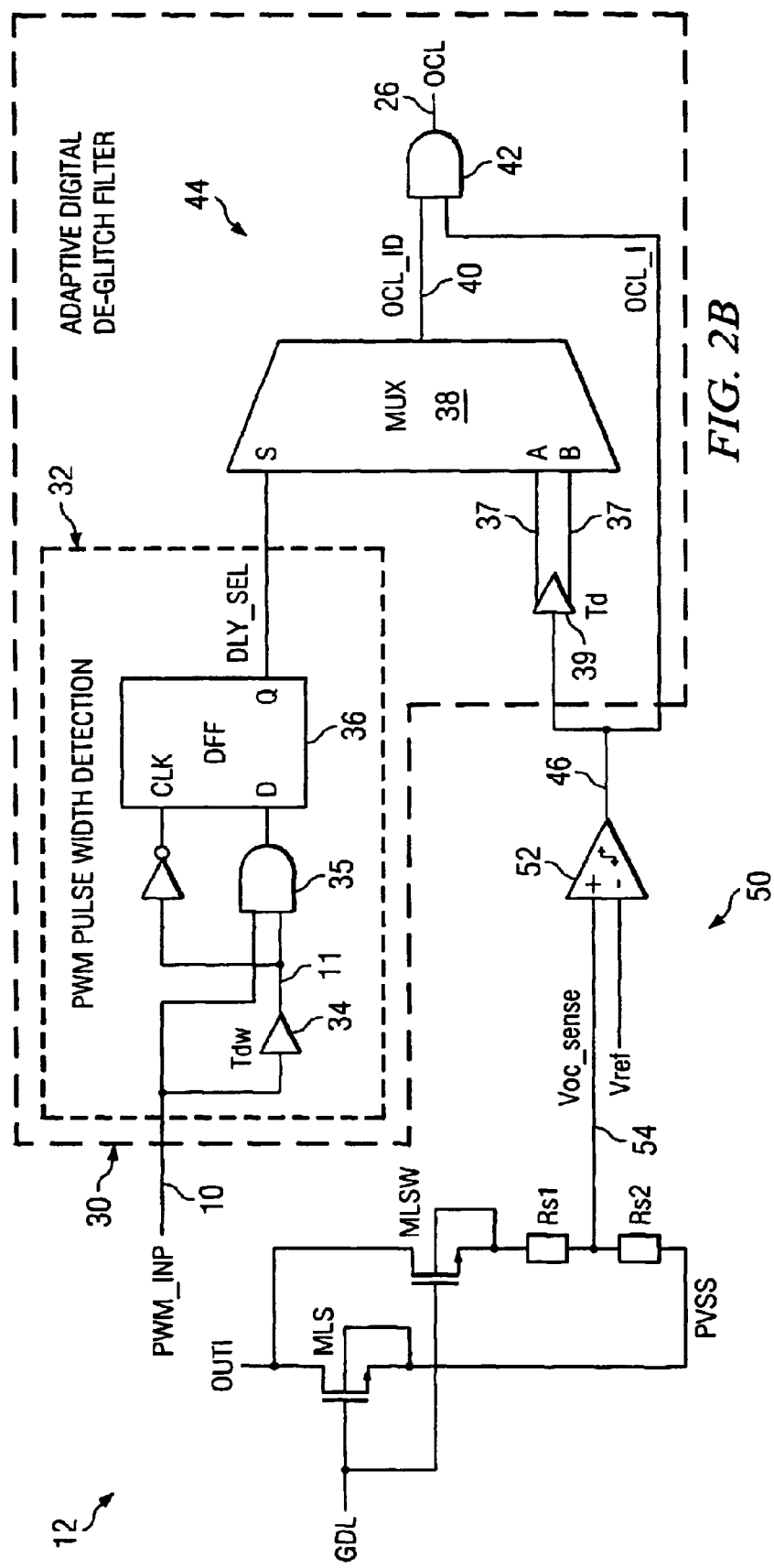
FIG. 2B is a schematic block diagram illustrating an example of an over-current detection circuit for low-side power MOSFET according to the invention.

Referring now primarily to FIG. 2A and FIG. 2B, the two schematic block diagrams illustrate an example of an over-current detection circuit and method according to the invention, showing the OC detection circuit for high-side and low-side power MOSFET, respectively. An example of an over-current detection circuit 30 is shown in an associated PWM stage 12. The over-current detection circuit 30 is configured to accept a PWM input signal 10 with a PWM pulse width detection circuit 32. The pulse width detection circuit 32 is preferably implemented using one or more digital ASIC cells. The exact implementation of the pulse width detection circuit 32 is not crucial to the practice of the invention so long as the capability to detect the pulse width of a signal in a PWM system 12 is provided. In the example shown, a delay component 34 is situated to receive the input signal 10 and generate a delayed input signal as shown by path 11. The input signal 10 and the delayed input signal 11 are passed to a logical AND gate 35. In the pulse width detection circuit arrangement 32 shown, the clock CLK of the D-flip-flop (DFF) 36 is connected to the inverted signal of the delayed input signal 11. The flip-flop 36 is sampling the output of the AND gate 35 at terminal D when a high-to-low transition is present at 11. The output of DFF 36 (Q) will be logic "high" when the pulse width of the PWM input signal 10 is greater than the delay of delay block 39.

Afterwards, the pulse width detection signal is used to select the appropriate delayed OC detection signal from the output of delay block 39 through a multiplexor 38. Multiplexor 38 has two selectable digital delay paths 37A and 37B from delay block 39. Preferably, the shortest delay path is made less than one half of the minimum pulse width of the PWM power stage 12. The output 40 of multiplexor MUX 38 is connected to one of the input terminal of the second AND logic gate 42. The output (40) of multiplexor 38 is subsequently "anded" with the over-current detection signal 46, which is the output of an over-current detection circuit 50. In this way, an over-current detection result 26 from the adaptive filter is valid only when over-current detection signal 46 is longer than the selected delay from 39. Thus, false over-current detection signals due to transient noise are filtered out. It should be appreciated by those skilled in the arts that the adaptive nature of the filter 44 selectively provides a delay from 39 relative to the pulse width of the input PWM signal 10. MUX 38, delay block 39, and logic "AND" gate 42, provide the necessary processing functions of an adaptive filter 44 when operated in conjunction with the pulse width detection circuit 32 as further described herein.

It may be noted with reference to FIGS. 2A and 2B that the over-current detection circuit 50 is typically implemented using a comparator 52 and associated sense elements 54 for comparison of the current level of the system 12 with a reference. Variations of the over-current detection circuit 50 are known in the arts and may be used without departure from the principles of the invention. It should also be understood that although two delay paths 37A and 37B, are shown in the present example, more delay paths may be provided without departing from the scope of the invention. In principle, the number of selectable delay paths that may be used is unlimited.

Figure 3:
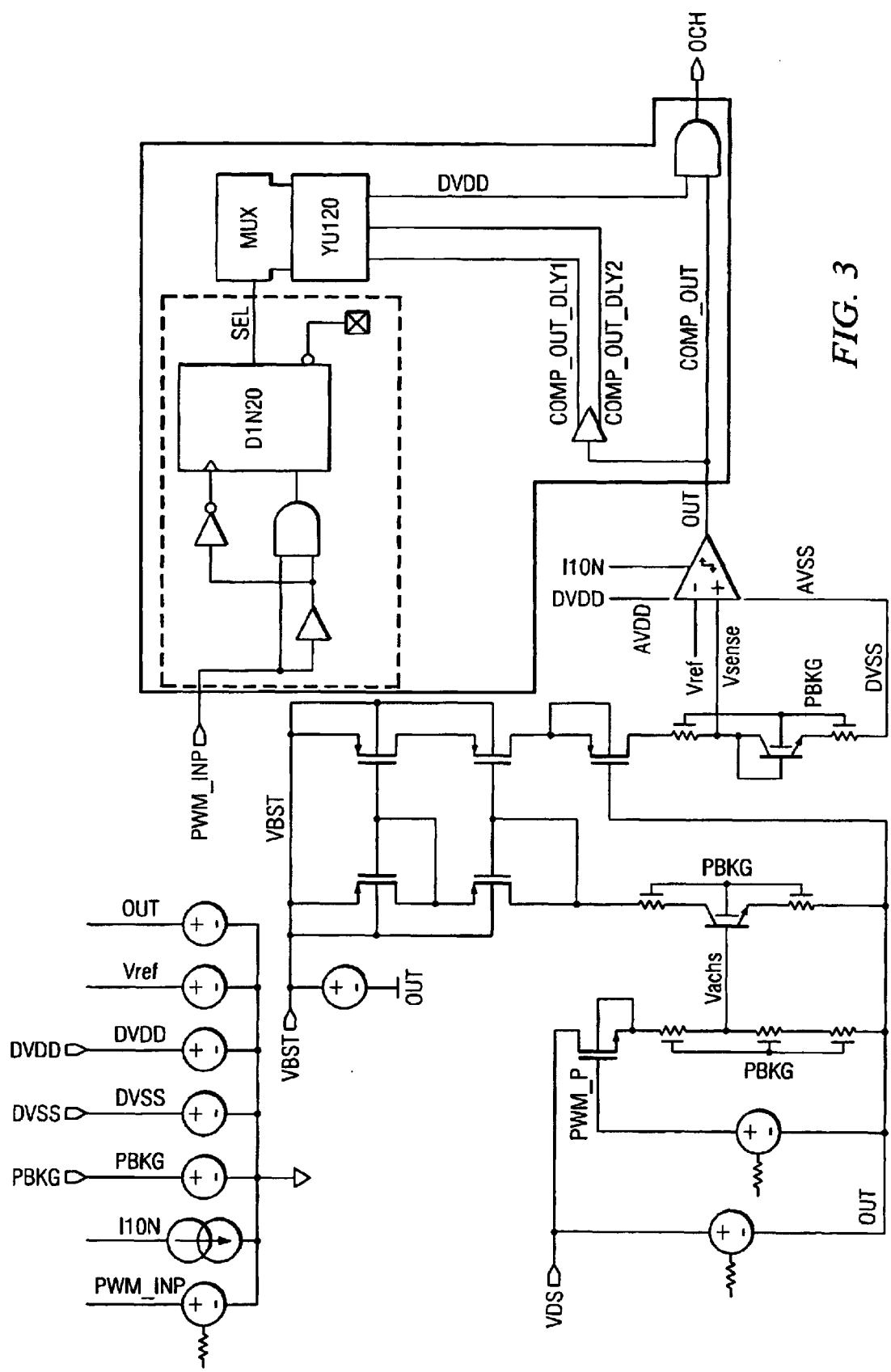
FIG. 3 is a circuit schematic diagram illustrating details of an example of a preferred embodiment of the invention and the simulation setup.
Figure 4A:
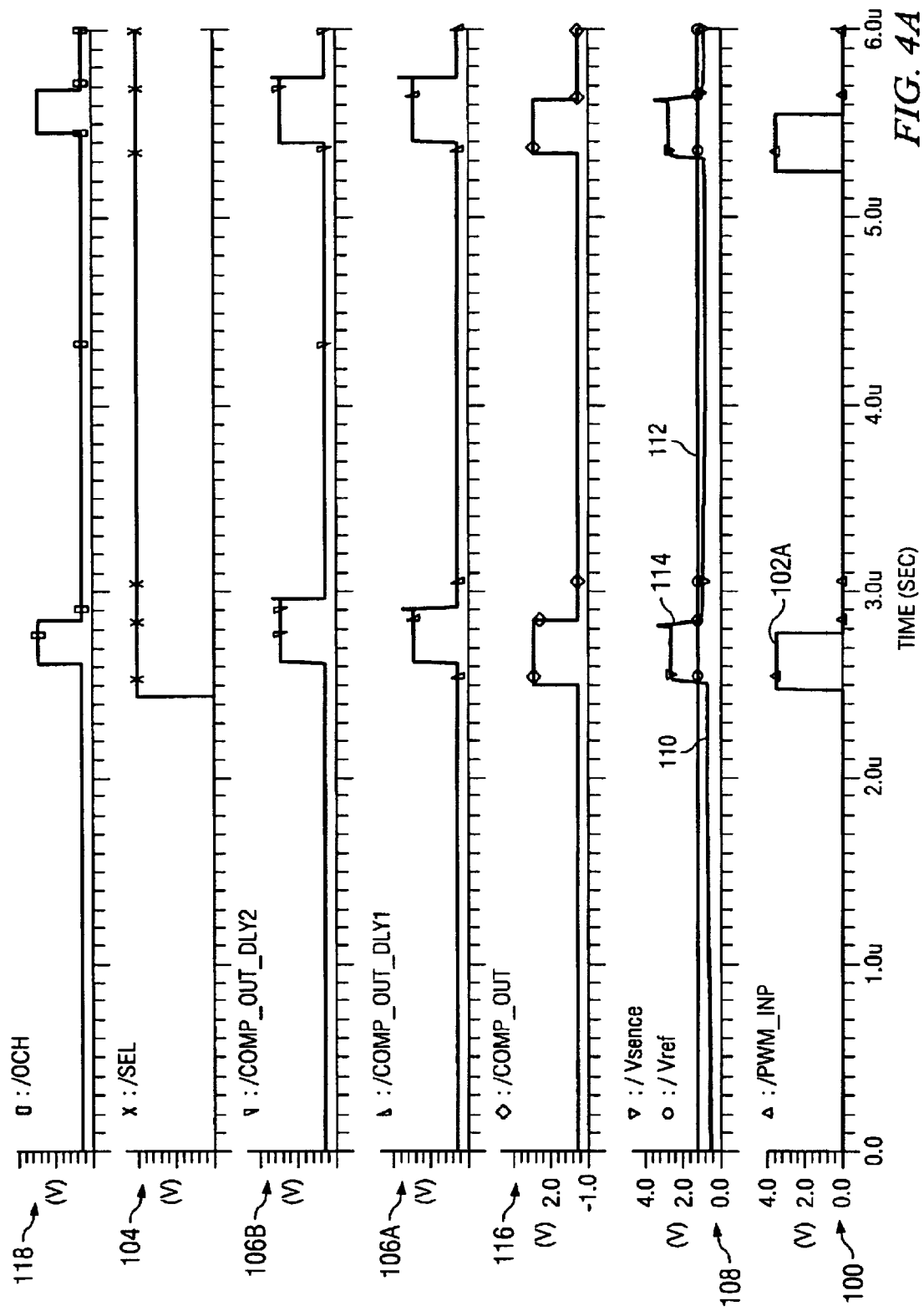
FIG. 4A is a graphical representation of the operation of a preferred embodiment of the invention consistent with the example of FIG. 3.
Figure 4B:
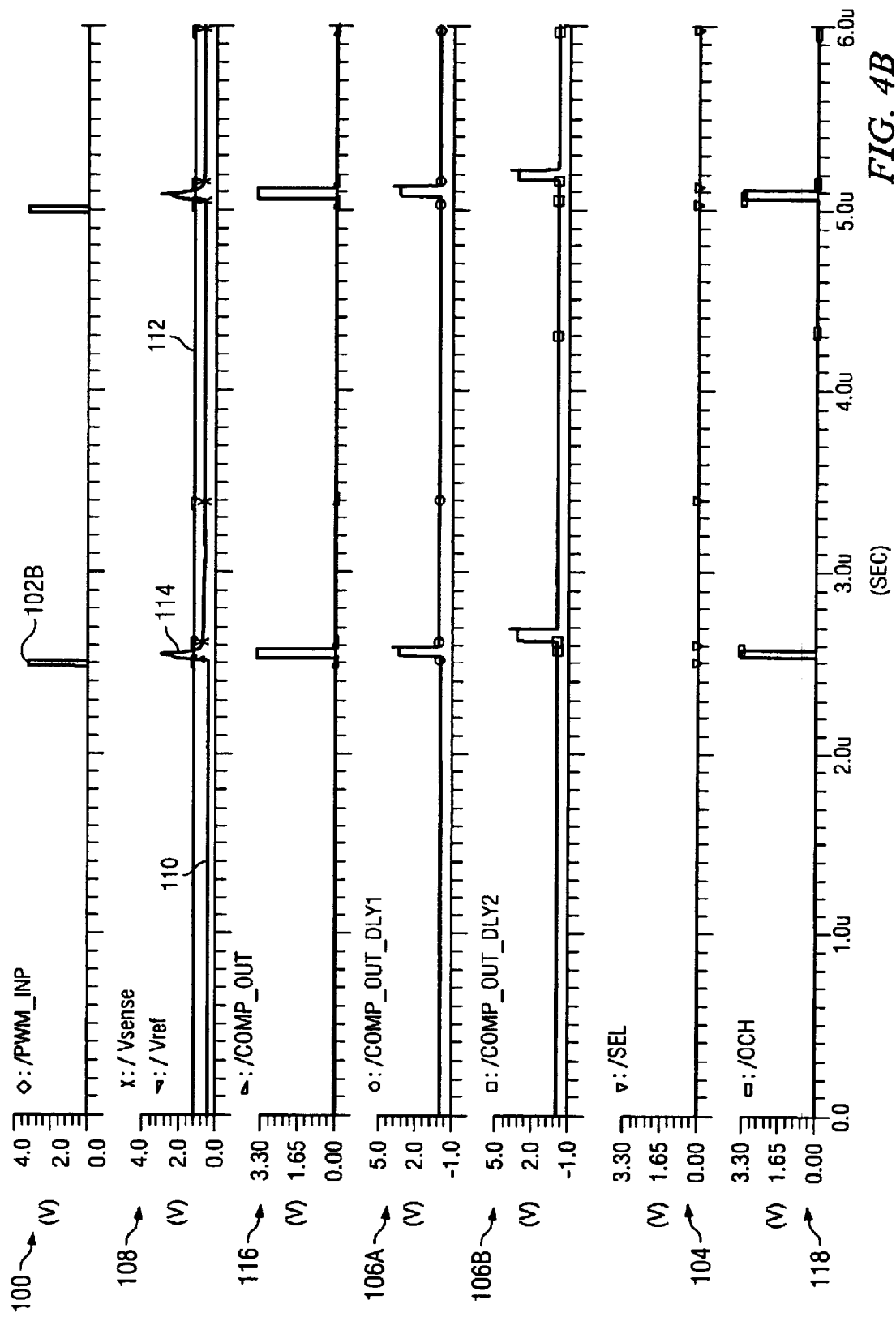
FIG. 4B is a further graphical representation of the operation of a preferred embodiment of the invention consistent with the example of FIG. 3.

FIG. 3 is a simulation setup schematic diagram illustrating details of an example of a preferred embodiment of the invention for high-side power MOSFET. The simulation results for both wide and narrow PWM inputs is shown in FIG. 4A and FIG. 4B and are described in following paragraphs. As noted, the exact configuration and specific circuit components are not crucial to the practical implementation of the invention. It is understood and expected that those skilled in the arts may employ alternative circuitry embodying the invention.

FIG. 4A as well as FIG. 4B are graphical representations of the operation of the preferred embodiment of the invention shown and described above. Over-current detection result voltage is represented on the vertical axes, and time is represented on the horizontal axes of the Figures. Of course the voltage levels and time intervals shown are for purposes of example and are not limitations of the invention. Examination and comparison of FIGS. 4A and 4B will enhance the understanding of the methods of the invention and the circuitry shown and described. The PWM input signal 100 may contain pulses 102A, 102B of various lengths. The delay selection signal 104 will be high when PWM pulse width is greater than the delay of 34 in FIG. 2A, and will be low when the pulse width is shorter than the delay of 34 in FIG. 2A. Based on the delay selection signal 104, an appropriate length of delay from 106A and 106B will be selected. In the case of FIG. 4A, a longer delay is selected because the pulse width detector provides logic "high" signal before detecting an over-current event. In the case of FIG. 4B, a shorter delay is selected based upon the logic "low" signal from the pulse width detector. In the PWM power stage 108, the voltage 110 is sensed, as a proxy for the current, by the over-current detection circuit. A comparison is made between the voltage 110 and a reference 112, and in the event of detection of an over-current event 114, an output 116 at the over-current detection circuit comparator is generated. Upon confirmation of an over-current event by the adaptive filter by the logical "AND" of the selected delay with the over-current detection circuit output, an over-current detection result 118 is generated. The over-current detection result 118 may be used in association with protection or alarm circuitry as specified in product specifications.

Thus, the invention provides methods and apparatus for adaptive over-current detection in PWM power stages. The embodiments described illustrate the adaptive filtering of detected over-current events according to the PWM pulse width, providing advantages including but not limited to detection accuracy despite variations in pulse width. While the invention has been described with reference to certain illustrative embodiments, the methods and apparatus described are not intended to be construed in a limited sense. Various modifications and combinations of the illustrative embodiments as well as other advantages and embodiments of the invention will be apparent to persons skilled in the art upon reference to the description and claims.

I claim:

1. In a PWM switching power output stage circuit, an over-current detection method comprising the steps of:
   detecting a pulse width of a PWM signal;
   detecting an over-current condition in the PWM circuit;
   adaptively filtering a detected over-current condition relative to the pulse width; and
   generating an over-current detection output,
   wherein the adaptively filtering step further comprises selecting a digital delay less than the pulse width of the PWM signal to ensure reliable detection.

2. In a PWM switching power output stage circuit an over-current detection method comprising the steps of:
   detecting a pulse width of a PWM signal;
   detecting an over-current condition in the PWM circuit;
   adaptively filtering a detected over-current condition relative to the pulse width; and
   generating an over-current detection output,
   further comprising the step of providing a plurality of selectable digital delays for adaptively filtering the detected over-current condition.

3. A method according to claim 1 further comprising the step of providing at least one selectable digital delay of less than one half of a pre-selected minimum pulse width of the PWM circuit.

4. In a PWM switching power output stage circuit, an over-current detection method comprising the steps of:
   detecting a pulse width of a PWM signal;
   detecting an over-current condition in the PWM circuit;
   adaptively filtering a detected over-current condition relative to the pulse width; and
   generating an over-current detection output,
   wherein the outputting step further comprises outputting a positive over-current detection result for an over-current detection signal having a duration equal to or greater than a selected digital delay.

5. An over-current detection method for application in a PWM switching power output stage circuit, the over-current detection method comprising the steps of:
   detecting a pulse width of a PWM signal in the PWM circuit;
   selecting a digital delay less than the pulse width of the PWM signal;
   detecting an over-current condition in the PWM circuit and providing an over-current detection signal;
   filtering the over-current detection signal by means of the digital delay; and
   outputting an over-current detection result.

6. A method according to claim 5 further comprising the step of providing a plurality of selectable digital delays.

7. A method according to claim 5 further comprising the step of providing at least one selectable digital delay of less than one half of a pre-selected minimum pulse width of the PWM circuit.

8. A method according to claim 5 wherein the filtering step further comprises the step of logically determining that the over-current detection signal and the selected digital delay are both true.

9. A method according to claim 5 wherein the outputting step further comprises outputting a positive over-current detection result for an over-current detection signal having a duration equal to or greater than the selected digital delay.

10. An over-current detection method for PWM switching power stages, the over-current detection method comprising the steps of:
    providing a plurality or selectable digital delays, at least one selectable digital delay having a duration less than one half of a pre-selected minimum pulse width of the PWM circuit;
    detecting a pulse width of a PWM signal in the PWM circuit;
    selecting a digital delay less than the pulse width of the PWM signal;
    detecting an over-current condition in the PWM power stage and providing an over-current detection signal;
    filtering the over-current detection signal by means of logically determining whether the over-current detection signal and a selected delayed OC detection signal are both true; and
    outputting an over-current detection result for an over-current detection signal having a duration greater than the selected digital delay.

11. An over-current detection circuit for use in a PWM switching power stage, the over-current detection circuit comprising:
    a plurality of selectable digital delay paths;
    a pulse width detection circuit for detecting a pulse width of a PWM signal in a PWM system;
    an over-current condition detector for detecting the presence of an over-current in the PWM system;
    a filter for outputting an over-current detection result for an over-current detection signal having a duration equal to or greater than the selected digital delay.

12. An over-current detection circuit according to claim 11 further comprising at least one selectable digital delay path having a duration less than one half of a pre-selected minimum pulse width of the PWM circuit.

13. An over-current detection circuit according to claim 11 further comprising digital logic means for detecting the presence of an over-current detection signal having a duration greater than the selected digital delay.

* * * * *